United States Patent [19]

Feichtner et al.

[11] Patent Number: 4,568,436
[45] Date of Patent: Feb. 4, 1986

[54] SEPARATION OF ISOTOPES OF ZIRCONIUM

[75] Inventors: John D. Feichtner, Murrysville; Donald E. Thomas; Bulent E. Yoldas, both of Pittsburgh, all of Pa.

[73] Assignee: Westinghouse Electric Corp., Pittsburgh, Pa.

[21] Appl. No.: 411,221

[22] Filed: Aug. 25, 1982

[51] Int. Cl.$^4$ .............................................. B01D 59/00
[52] U.S. Cl. .................................... 204/157.22; 75/84
[58] Field of Search ..................... 204/157.1 R, 158 R; 75/84

[56] References Cited

U.S. PATENT DOCUMENTS

| | | |
|---|---|---|
| 3,443,087 | 5/1969 | Robieux et al. . |
| 3,937,956 | 2/1976 | Lyon . |
| 3,941,670 | 3/1976 | Pratt . |
| 4,020,350 | 4/1977 | Ducas . |
| 4,024,217 | 5/1977 | Wexler et al. . |
| 4,025,790 | 5/1977 | Jetter et al. . |
| 4,096,046 | 6/1978 | Niemann . |
| 4,097,384 | 6/1978 | Coleman et al. ............. 204/157.1 R |
| 4,166,951 | 9/1979 | Garbuny . |
| 4,389,292 | 6/1983 | Phillips et al. ................. 204/158 R |

OTHER PUBLICATIONS

Miller et al., "Infrared Photochemistry of a Volatile Uranium Compound . . . ", ©1979 *Amer. Chem. Soc.*, pp. 1035, 1037.

Dewitt, "A Survey of Large-Scale Isotope Applications", Mound Lab.-U.S. Gov't Contract EY-76-C-04-0053, 1977.

*Primary Examiner*—Deborah L. Kyle
*Attorney, Agent, or Firm*—John J. Prizzi

[57] ABSTRACT

The absorption of neutrons of a nuclear reactor without producing fissions is reduced by providing selected isotopes of zirconium for fabrication of parts such as cladding, thimble tubes and grids. Specifically, the zirconium is enriched in $^{90}Zr$ or is depleted in $^{91}Zr$. The selected isotopes are produced by irradiating $Zr(OC_4H_9)_4{}^t$, $Zr(OC_5H_{11})_4{}^t$ and/or $Zr(OC_3H_7)_4{}^t$, with radiation from a $CO_2$ laser tuned to the vibrations of the $CO(^{90}Zr)$ bond or the $O(^{91}Zr)$ bond.

14 Claims, 6 Drawing Figures

SEPARATION OF ISOTOPES OF ZIRCONIUM

BACKGROUND OF THE INVENTION

This invention relates to the nuclear art and to the art of separating isotopes and it has particular relationship to the separation of selected isotopes of zirconium to improve the efficiency of nuclear reactors. Zirconium is used predominantly for parts or components of nuclear reactors such as cladding for fuel, thimble tubes, grids, pressure tubes (CANDU reactor), fuel plates, cladding liners and the like. Zirconium contains nuclei which absorb neutrons without producing corresponding fissions. This parasitic absorption reduces the overall efficiency of a reactor and its capability of using the quantity of the nuclear fuel loaded into the reactor which it could use in the absence of this neutron absorption. In addition, the minerals from which zirconium is derived contain hafnium which has a very high neutron absorption cross section. In the processing of these minerals to derive zirconium not all the hafnium can be removed and the efficiency of a reactor is reduced in accordance with the quantity of residual hafnium which is retained in the zirconium of its parts. It is an object of this invention to improve the efficiency of nuclear reactors by reducing absorption of neutrons without resulting fissions by the zirconium components or parts of the reactor.

The naturally occurring isotopes of zirconium, and their neutron cross sections and abundances are shown in the following Table I:

TABLE I

| | | Isotopes in Natural Zirconium | | | |
|---|---|---|---|---|---|
| Isotope | Abundance, A | Cross Section (Barns) For Thermal Neutrons, $\delta_T$ | Product, $\delta_T \cdot A$ | Cross Section (Barns) For Fast Neutrons, $\delta_F$ | Product, $\delta_F \cdot A$ |
| $^{90}Zr$ | 0.515 | 0.03281 | 0.01690 | 0.01565 | 0.00806 |
| $^{91}Zr$ | 0.112 | 0.5367 | 0.06011 | 0.1604 | 0.01796 |
| $^{92}Zr$ | 0.171 | 0.08601 | 0.01471 | 0.03285 | 0.00562 |
| $^{94}Zr$ | 0.174 | 0.03012 | 0.00524 | 0.01979 | 0.00344 |
| $^{96}Zr$ | 0.028 | 0.01294 | 0.00036 | 0.1996 | 0.00559 |
| Total | 1.000 | | 0.09732 | | 0.04121 |

Table I shows that the effective thermal neutron-absorption cross section of the zirconium could be reduced from its natural value of 0.09732 barns to 0.03281 barns, a factor of about three, if only the isotope $^{90}Zr$ were present. Correspondingly the fast neutron absorption cross section would be reduced from its natural value of 0.04121 barns to 0.00806 barns if only $^{90}Zr$ were present, a reduction by a factor of five. The maximum yield of a process to separate $^{90}Zr$ would be 51.5%. Alternatively, if $^{91}Zr$ were removed from the natural mix of isotopes and the remaining isotopic mix of $^{90}Zr$, $^{92}Zr$, $^{94}Zr$, and $^{96}Zr$ were utilized, the thermal and fast neutron absorption cross-section would be 0.0419 and 0.0256 barns, respectively. The maximum yield of a process to remove $^{91}Zr$ would be 88.8%. If $^{94}Zr$ were to be separated it would have attractive thermal and fast neutron absorption cross sections of 0.03012 and 0.01979 barns, respectively, but the maximum yield would be only 17.4%. Such separations are within the scope of equivalents of this invention.

Computer calculations based on existing codes for specific thermal reactors have shown that if $^{90}Zr$ were separated and used in a pressurized water reactor having 4 loops, fuel cost savings of 7% would result. Similar calculations relative to removing $^{91}Zr$ and using the remaining isotopes in the reactor have shown that a 5% fuel cost saving would result. In either case the fuel cost saving is a substantial amount of money per reactor core loading, such that if all of the saving were assigned to the cost of performing the necessary isotopic separations, it would amount to $115 per pound of Zircaloy-4 alloy for the $^{90}Zr$ separation case, and $80 per pound of Zircaloy-4 alloy for the $^{91}Zr$ removal case. These figures are based on fuel costs of 50¢/MBTU.

The ratio of Hf to Zr in zirconium bearing minerals varies widely, typically between 1% and in excess of 10% by weight. However, the commercial ores used for deriving zirconium for nuclear reactor parts have a hafnium content amounting to between 1 and 2% of the zirconium content. Since hafnium has a high thermal neutron absorption cross section of 103 barns and in addition has a series of resonances in the range of 1 to 200 eV, it is necessary to remove it during the processing of the zirconium ore to zirconium metal. This is currently done in the United States by means of a liquid-liquid extraction process involving the preferential extraction of hafnium from a hafnium thiocyanate complex into methyl isobutyl ketone (hexone). This so-called hexone-thiocyanate process accounts for 14% of the capital costs and 20% of the operating costs of a plant which converts beneficiated ore to intermediate metal product (mainly tube blanks), reflecting the difficulty of separating the two metals, which have very similar chemical properties. The current specification of Westinghouse Electric Corporation for the hafnium content of reactor-grade zirconium is 100 ppm (by weight) maximum, while actual values range from ~30 ppm to ~87 ppm.

Separation of hafnium from the zirconium which is used to make nuclear-reactor parts has an important advantage in addition to improving the efficiency of a nuclear reactor. The separated hafnium has important uses. It is used in nuclear reactors as a neutron absorbing material for control rods. It is also used as an alloying additive in a number of alloys, for example superalloys, which serve non-nuclear purposes.

Based on the above factors it is an object of this invention to improve the efficiency of a nuclear reactor by enriching the zirconium used in forming nuclear-reactor parts in isotopes having low neutron-absorption cross-sections or depleting this zirconium in isotopes having high neutron-absorption cross section and further by separating and recovering the hafnium from this zirconium and particularly from the depleted zirconium.

SUMMARY OF THE INVENTION

This invention arises from the realization that zirconium including a plurality of isotopes can be effectively processed to separate its isotopes selectively by appropriate laser radiation of its alkoxides, zirconium tetra-tertiary butoxide, $Zr(OC_4H_9)_4{}^t$, zirconium tetra-tertiary amyloxide, $Zr(OC_5H_{11})_4{}^t$ and zirconium tetra-tertiary isopropoxide, $Zr(OC_3H_7)_4{}^t$. The structural formula for the butoxide is:

The structural formula for the amyloxide is:

The structural formula for the isopropoxide is as follows:

At room temperature the butoxide is a viscous liquid, the amyloxide is a mobile liquid and the isopropoxide is a white powder. The butoxide and the amyloxide have a high vapor pressure at moderately elevated temperatures. The isopropoxide has a lower vapor pressure. However, the isopropoxide has the advantage that is chemical synthesis requires one less step than the other alkoxides. The temperatures to which all three alkoxides need be heated to provide adequate or useful vapor pressures are below the decomposition temperature for the molecules. Metal alkoxides, including zirconium alkoxides, their properties and their synthesis are described in *Metal Alkoxides*, Bradley et al Academic Press, NY, 1978. Typically, the alkoxides of zirconium are derived by treating zirconium-hafnium chloride, (Zr, Hf)Cl$_4$, by known reaction. In the practice of this invention the zirconium alkoxides are disposed in a vaporization chamber at a temperature at which they have substantial vapor pressure but are not decomposed. This temperature should be less than 250° C. to 300° C. typically about 150° C. to 200° C. The vapor of the alkoxides are swept from the chamber into a reaction chamber by a non-reactive gas such as helium or nitrogen. The vaporization chamber is connected to the reaction chambers by a nozzle so that the vapor along with the carrier gas is adiabatically expanded into the reaction chamber. The vapor is thus cooled to reduce the population of higher quantum levels.

Care must be taken to prevent the penetration of moisture into the vaporization chamber or the reaction chamber to suppress hydrolysis of the alkoxides. In particular, the gas which sweeps the vapor into the reaction chamber must be free of moisture.

In the reaction chamber the gas flows in a stream and is irradiated by a laser beam, from an appropriately tuned $CO_2$ laser and optionally by additional laser beams tuned to different frequencies. The $CO_2$ laser may be tuned so that it resonates with the frequency of the vibration of the selected C—O—Zr bonds or of the selected O—Zr bond of the compound. Typically where $^{90}Zr$ is to be separated and the Zr tert-amyloxide molecule is the alkoxide chosen for the reaction, the $CO_2$ laser is tuned to 1020 cm$^{-1}$ wave number or to a wavelength of 9.8 microns to resonate with the vibration of the C—O—$^{90}Zr$ bond and to 545 cm$^{-1}$ wave number or a wavelength 17.5 microns to resonate with the vibration of the O—$^{90}Zr$ bond. The frequency is $3 \times 10^{10}$ times the wave number.

The general process by which incident infrared laser radiation causes the selective decomposition is known as "isotopically selective infrared multiphoton dissociation". The photons exciting a molecule may be all at the same frequency or they may be distributed among two or more different frequencies, commonly called colors. Thus, there is proposed two-color, three-color, or higher infrared multiphoton dissociation. This multicolor approach can provide enhanced isotopic selectivity over a one-color dissociation process.

The photochemical reaction which takes place as a result of the radiation of the butoxide to separate the $^{90}Zr$ is The * indicates that the molecule is excited. The $nh\nu$ indicates that $n(n=1,2,3 \ldots)$ photons (which may or may not be all of the same frequency) have been absorbed by, and excite, the molecule to a level from which it decomposes. Typically, n is of the order of 10 to 30 infrared photons. The excited molecule decomposes. A possible decomposition reaction is:

It is to be understood that this reaction and others presented below are presented here by way of explanation as a possible reaction and not as a certain reaction. This application and any patent granted on or as a result thereof is in no way to be judged on its merits based on whether this or any other reaction is the true decomposition reaction. In any event, at room temperature the $^{90}ZrO(OC_4H_9)_2$ is a white powder, the $C_4H_9OH$ butanol is a liquid and the $C_4H_8$, which may have a number of forms, is a gas. The powder is readily separated from the liquid and gas. The other isotopes, $^{91}Zr$, $^{92}Zr$, $^{94}Zr$, $^{96}Zr$, remain as the compounds zirconium butoxide and zirconium amyloxide or zirconium isopropoxide in the vapor phase and are also readily separable from the powder.

An alternative possible decomposition reaction involving the excited butoxide is The excited $^{90}Zr(OC_4H_9)_3{}^*$ is converted into $^{90}ZrO(OC_4H_9)_2$ as follows $$^{90}Zr(OC_4H_9)_3{}^* \rightarrow {}^{90}ZrO(OC_4H_9)_2 + C_4H_8 + \tfrac{1}{2}H_2$$

or is polymerized

$$n{}^{90}Zr(OC_4H_9)_3{}^* \rightarrow [{}^{90}Zr(OC_4H_9)_3]_n.$$

In either case the $^{90}Zr$ is readily recoverable.

Possible reactions for the amyloxide are as follows:

Zirconium 90 is derivable from the $ZrO(OC_5H_{11})_2$ or from the polymer.

The dissociation and recovery reactions of the isopropoxide are analogous.

As shown above there are a number of possible ways in which the selectively excited molecules may break down. In accordance with this invention additional hydrogen or hydrogen containing species may be added to the reaction. The addition of hydrogen or hydrogen containing species to the system permits a degree of control over the products and removal of split-off alkoxy groups. Whatever practice is followed the decomposition product containing the isotope to be separated can be separated from the remaining unexcited species by virtue of their altered physical and/or chemical properties. The final physical separation is by the precipitation of the decomposition product as a liquid or a solid from the gaseous mixture.

The metallic zirconium is readily derived from the powder or from the polymer. It is converted into zirconium alloy which is fabricated into nuclear reactor parts. The nominal composition of a typical zirconium alloy referred to as ZIRCALOY-4 is Sn—1.2 to 1.7 weight %
Fe—0.18 to 0.24 weight %
Cr—0.07 to 0.13 weight %
Fe+Cr—0.28–0.37 weight %
Zr—Remainder There is also a Zr—2.5% Nb alloy and alloys referred to as ZIRLO alloys. Unalloyed zirconium has also been considered.

An alternative strategy is to remove the $^{91}Zr$ isotope and use the depleted material for the nuclear reactor parts. In this case the usable zirconium is 88.8% of natural zirconium. The $^{91}Zr$ is removed by irradiating the vapor stream with radiation having a wave number of displaced about 0.1 from the wave number required for $^{90}Zr$, or by a $CO_2$ Raman-shifted laser in the vicinity of 545 cm$^{-1}$ wave number for the O—Zr bond. In this case the vapor, remaining after the white powder $^{91}ZrO(OC_4H_9)_2$ or $^{91}ZrO(OC_5H_{11})_2$ or the corresponding polymers and the liquid $C_4H_2OH$ are removed, is condensed. The $C_4H_8$ is volatile and is removed during the condensation. The product of the condensation is treated to derive zirconium which is suitably alloyed and fabricated into reactor parts. In this case it is also desirable to remove and recover the hafnium as an additional step. The hafnium is present as hafnium tetra-tertiary butoxide, hafnium tetra-tertiary amyloxide or hafnium tetra-tertiary isopropoxide and may be removed chemically. To the extent that chemical separation may not be effective because the chemical properties of zirconium and hafnium are closely related, the hafnium may be removed by laser radiation. The hafnium isotopes are $^{174}Hf$, $^{176}Hf$, $^{177}Hf$, $^{178}Hf$, $^{179}Hf$ and $^{180}Hf$. They can be removed by irradiation with a $CO_2$ laser which produces radiation of 1040 cm$^{-1}$ wave number. The laser radiation should have a bandwidth sufficient to encompass the isotopes of hafnium.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF PRACTICE OF INVENTION

Figure 1:
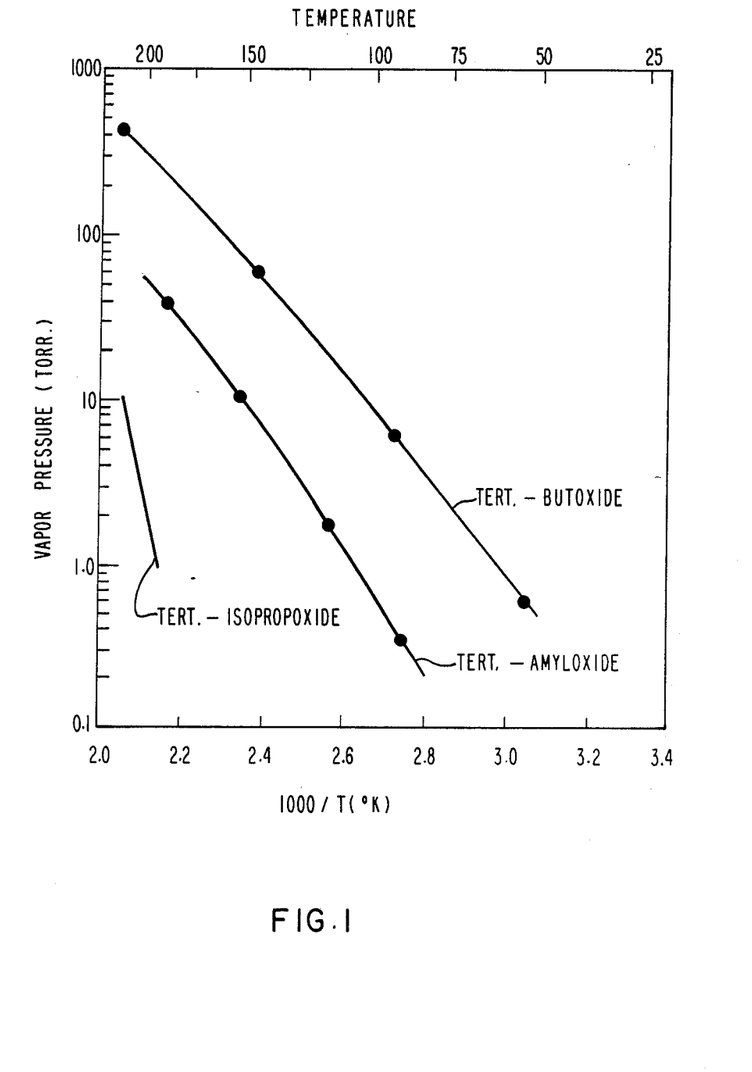
FIG. 1 is a graph presenting the vapor pressure of the zirconium tetra-tertiary butoxide, of the zirconium tetra-tertiary amyloxide and of the zirconium tetra-tertiary isopropoxide as a function of temperature.

In FIG. 1 vapor pressure in Torr is plotted vertically and a function 1000 divided by the absolute temperature, T, is plotted horizontally along the lower axis. The Centigrade degrees corresponding to 1000/T at selected points are shown along a line at the top of the graph. The vertical axis is graduated logarithmically. The upper curve shows the vapor pressure of zirconium tertiary butoxide as a function of 1000/T, the center curve the vapor pressure of zirconium tertiary amyloxide as a function of 1000/T, and the lower curve the vapor pressure of the zicronium tertiary isopropoxide as a function of 1000/T. A Torr is equal to the pressure of 1 millimeter of mercury. Atmospheric pressure is 760 Torr.

FIG. 1 shows that at temperatures between 150° C. and 200° C. the vapor pressure of the butoxide is between 70 and 200 Torr and of the amyloxide between 10 and 60 Torr. The rate of increase as a function of rising temperature is high.

Figure 2:
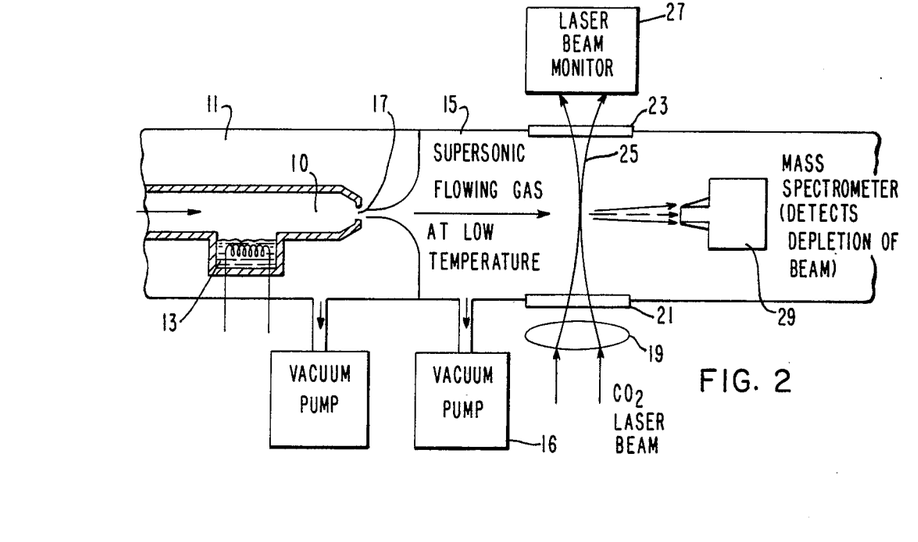
FIG. 2 is a diagrammatic view showing apparatus for demonstrating the effectiveness of the separation of the zirconium isotopes by irradiating zirconium tertiary amyloxide with a laser beam.

The apparatus shown in FIG. 2 includes a chamber 10 in which the vapor from the alkoxide under test is produced. The chamber 10 is sealed and contains a vessel 13 which contains the alkoxide. The vessel 13 is heated to the desired temperature. There is also a reaction chamber 15. The chamber 15 is maintained continuously evacuated by a pump 16. The vapor of the alkoxide is swept from vessel 13 by, and entrained in, the non-reactive carrier gas. This mixture is injected from the nozzle chamber 10 into the reaction chamber 15 through a nozzle 17. The vapor passing through the nozzle 17 expands adiabatically into the reaction chamber 15 producing a vapor stream substantially reduced in temperature flowing at a supersonic velocity. The energy given up by the vapor in expanding is converted into kinetic energy in the gas producing the supersonic stream. The apparatus also includes a $CO_2$ laser 19. The reaction chamber 15 is provided with windows 21 and 23 of a material capable of passing the infrared beam from the laser. The laser beam 25 passes through windows 21 and is focussed on the stream of vapor so as to irradiate the vapor. The beam 25 passes out through window 23 and impinges on a monitor 27. The apparatus also includes a mass spectrometer 29. The stream of gas after passing to the region where it is irradiated enters into the mass spectrometer 29.

Figure 3:
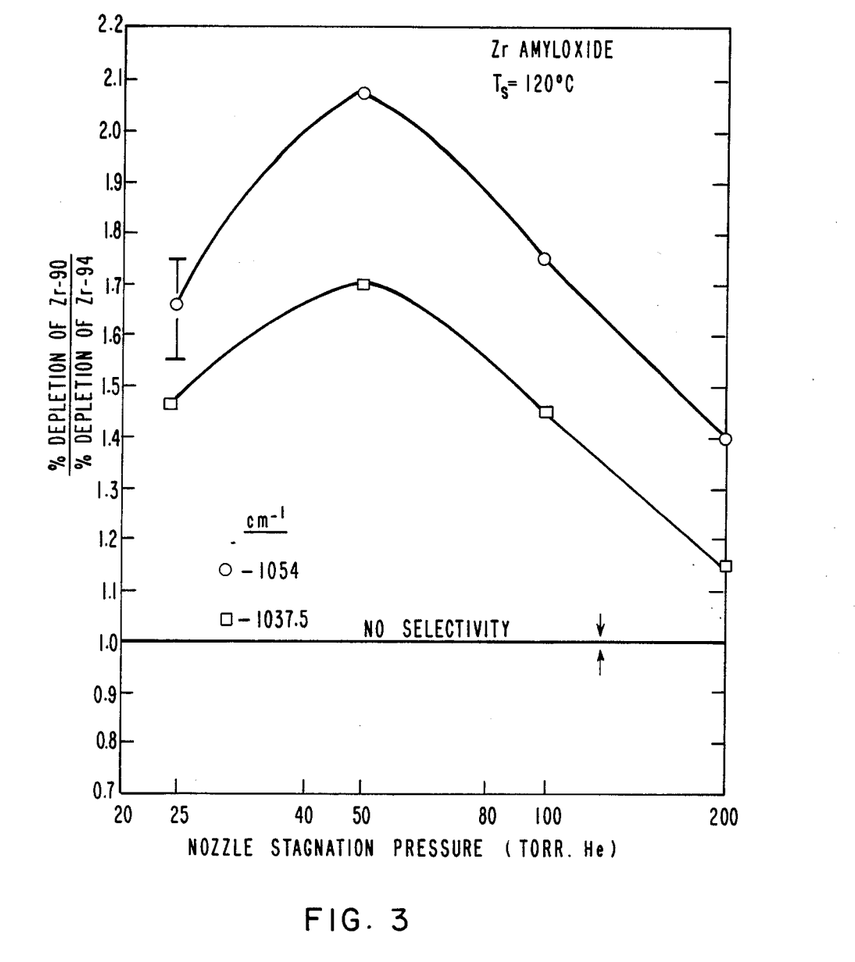
FIG. 3 is a graph showing the effectiveness of the separation of two isotopes of zirconium with the apparatus shown in FIG. 2.

The spectrometer produces a signal having peaks at positions corresponding to the masses of the isotopes of zirconium. The height of each peak is a measure of the content in the material evaluated of the corresponding isotope. Mass spectrometer peaks for the unirradiated beam were compared with peaks for the irradiated beam. The results of the comparison are shown in FIG. 3. This graph is based on data obtained for zirconium tertiary amyloxide. The amyloxide was maintained at 120° C. in chamber 10. The quotient equal to the percent depletion of Zr-90 divided by the percent depletion of Zr-94 is plotted vertically and the pressure of the gas in chamber 10 in Torr is plotted horizontally. As indicated the chamber 10 includes helium as well as the vapor. The helium is unaffected by the radiation. The percent depletion is a measure of the extent to which each isotope is dissociated by the laser radiation. Two curves are plotted; the upper curve for laser radiation at wave number 1054 $cm^{-1}$ and the lower curve for laser radiation at wave number 1037.5 $cm^{-1}$. The horizontal line at ratio 1 is the hypothetical curve for equal dissociation probability of each isotope.

FIG. 3 shows that $^{90}Zr$ amyloxide was dissociated to a greater extent than the $^{94}Zr$ amyloxide particularly at 1054 $cm^{-1}$ wave number. The ratio is at maximum for both curves at about 50 Torr. As the pressure in chamber 10 increases, the temperature of the gas stream in chamber 15 decreases. It may be that the decrease from the maximum is to an extent caused by the decrease in temperature. The relationship between the upper and the lower curve shows that by proper tuning, a high enrichment of $^{90}Zr$ may be achieved.

Figure 4:
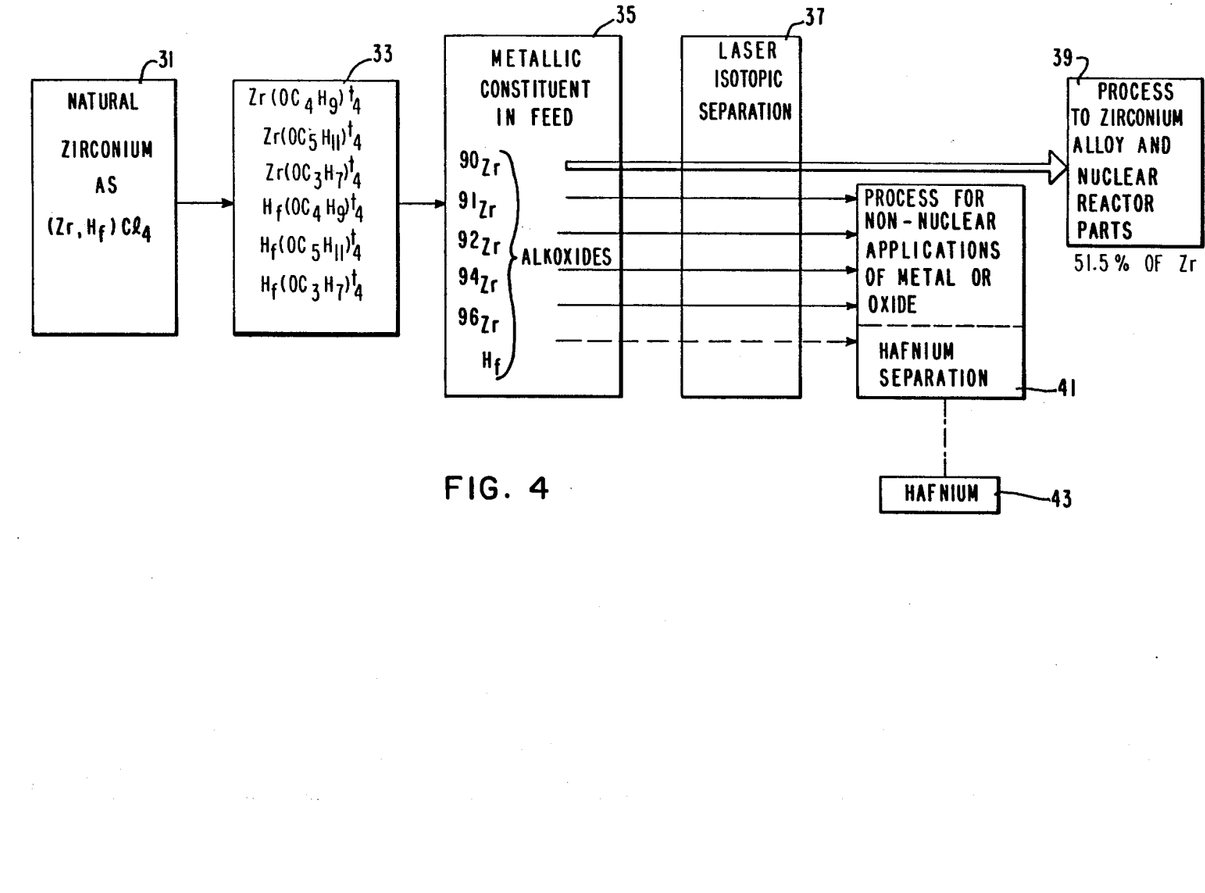
FIG. 4 is a flow chart showing the production of zirconium enriched in $^{90}Zr$.

As shown in the flow chart of FIG. 4, the starting point, block 31, is natural zirconium and hafnium with all of the isotopes as $(Zr, Hf)Cl_4$. This compound is converted into the three each zirconium and hafnium alkoxides (block 33). The alkoxides serve as feed (block 35) for the laser treatment (block 37) to provide a material highly enriched in $^{90}Zr$. The $^{90}Zr$ alkoxides are converted into the powders $^{90}ZrO(OC_4H_9)_2$ or $^{90}ZrO(OC_5H_{11})_2$ or $^{90}Zr(OC_3H_7)_2$ or into the polymers $[Zr(OC_4H_9)_3]_n$ or $[Zr(OC_5H_{11})_3]_n$ or $[Zr(OC_3H_7)_2]_n$ and separated out. This separated material constitutes nearly 51.5% of the feed, depending on the degree of enrichment, and is processed to zirconium alloy and the reactor parts (block 39). The remainder of the feed including the hafnium is separated out (block 41). It is emphasized that this strategy has the advantage that the hafnium, which is highly absorbent of neutrons, is separated out without any separate processing confined to the hafnium. The separation of the hafnium is optional (block 43).

Figure 5:
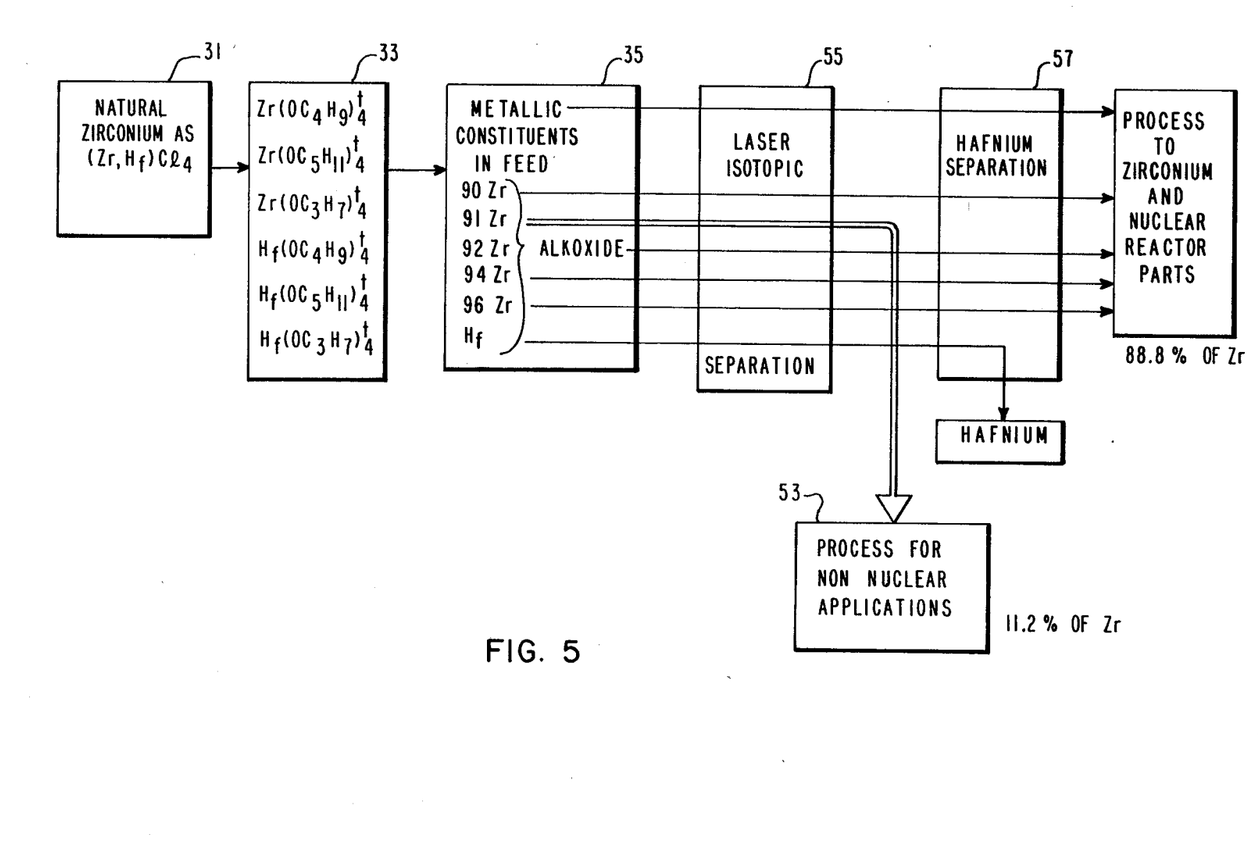
FIG. 5 is a flow chart showing the production of zirconium depleted in $^{91}Zr$.

Another strategy is shown in FIG. 5. The three alkoxides are irradiated with a laser beam of appropriate frequency to produce excited $^{91}Zr(OC_4H_9)_4{'}^*$ or $^{91}Zr(OC_5H_{11})_4{'}^*$ or $^{91}Zr(OC_3H_7)_4{'}^*$. These alkoxides are converted into $^{91}ZrO(OC_4H_9)_2$ or $^{91}ZrO(OC_5H_{11})_2$ or $^{91}Zr(OC_3H_7)_2$, or into the polymers $[^{91}Zr(OC_4H_9)_3]_n$ or $[^{91}Zr(OC_5H_{11})_3]_n$, or $[^{91}Zr(OC_3H_7)_3]_n$, and separated out for use in non-nuclear applications (block 53). The remainder of the material including the alkoxides of the isotopes $^{90}Zr$, $^{92}Zr$, $^{94}Zr$, $^{96}Zr$ and of hafnium are irradiated to excite the two hafnium alkoxides (block 55). The hafnium alkoxides are converted into separable compounds and are separated out (block 57). The remainder of the material is processed to zirconium alloy and fabricated into parts for nuclear reactor (block 59). Nearly 90% of the material, depending on the degree of depletion of $^{91}Zr$, is processsed and fabricated.

Figure 6:
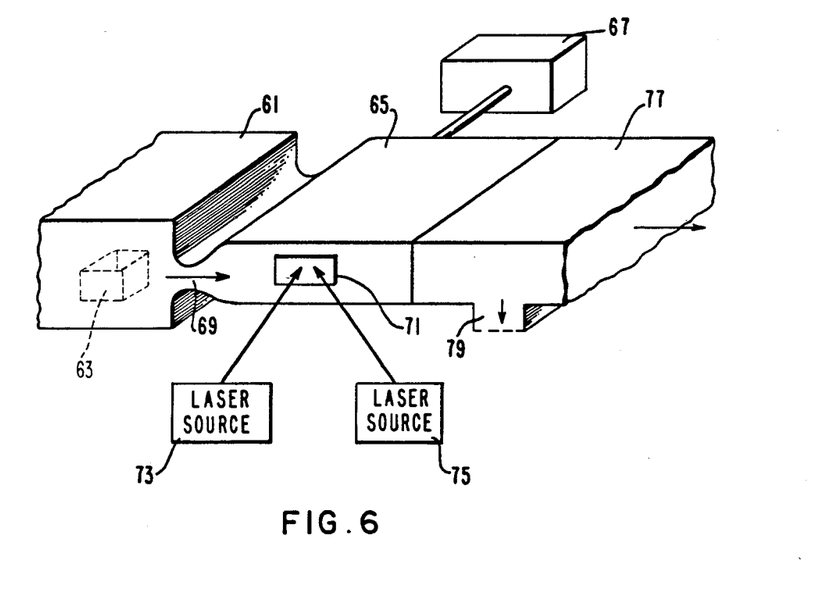
FIG. 6 is a diagrammatic view showing apparatus for practicing this invention.

The apparatus for processing the material, shown in FIG. 6, includes a vaporization chamber 61 in which the zirconium and hafnium alkoxides are vaporized. The alkoxides may be in a container 63 which is heated to the desired temperature, usually between 150° C. and 200° C. In addition, helium is continuously supplied to the chamber at a partial pressure of about 10 to 1000 Torr sweeping through the chamber and carrying the vapor with it. The apparatus also includes a reaction chamber 65 which is maintained continuously pumped by pump 67 to a low pressure. The alkoxide vapor and the helium are injected into chamber 65 through a nozzle or constriction 69. The admitted mixture of vapor and gas expands adiabatically. The mixture is cooled substantially to a temperature of typically, about 50° K. to 300° K. The heat energy in the gas is converted into kinetic energy of the gas molecules and the mixture of gas and vapor flows as a concentrated stream at a high velocity. The reaction chamber 65 includes a window 71. There is also a window (not shown) opposite window 71. There are also laser sources 73 and 75. The radiation from these sources is directed into the stream. It is desirable for the cross section of the irradiating beam to be of sufficient height to overlap the flowing gas stream transversely. Typically, the laser and associated optics should be capable of providing energy densities of from one to ten joules/$cm^2$ incident on the gas stream in order to dissociate the alkoxides. The laser source 73 is a $CO_2$ laser tuned to the vibration frequency of the selected bond of the molecules. If the C—O—$^{90}Zr$ bond is selected, the laser is a $CO_2$ laser tuned to a frequency of 1020 $cm^{-1}$ wave number or may be 1045 $cm^{-1}$ wave number, and possibly other frequencies. If the O—$^{90}Zr$ bond is selected, the laser is a Raman-shifted $CO_2$ laser. Such a laser produces a beam which may be tuned to between 300 and 900 $cm^{-1}$ wave number and is tuned to a frequency of 545 $cm^{-1}$ wave number. If the C—O—$^{91}Zr$ bond is selected the laser source is a $CO_2$ laser tuned to a wave number displaced by 0.1 $cm^{-1}$ from 1045 $cm^{-1}$. For O—$^{91}Zr$ bond a Raman-shifted laser tuned to a wave number displaced 1.5 $cm^{-1}$ wave number from 545 $cm^{-1}$ is selected. It has been observed that the degree of cooling attained in the flow affects the optimum wave number for each separation by several cm$^{-1}$, because the population of the quantum levels changes with temperatures. Therefore, the frequencies cited are intended only as general guide lines and are not intended to restrict the invention per se.

The use of laser source 75 or a plurality of such sources is optional. Its purpose is to dissociate the molecules which have been isotopically selectively excited by source 73 in the cases in which the two-color or multi-color infrared multi-photon dissociation approach is chosen. Such a scheme has the advantage that the source 73, which performs only the isotopically selective vibrational excitation, is required to furnish only one or a few photons to selectively excite the molecules, and thus is not required to be an extremely high power laser. Source 75 acts merely to supply the photons necessary to finally bring each selectively excited molecule to the dissociation level; because the isotopic selection has already been performed by source 73. Source 75 need not be tuned so exactly, and is a less costly source. Where the selected isotope is $^{90}Zr$ and the excited bond is C—O—$^{90}Zr$ the frequency of laser source or sources 75 may be greater or less than the excitation frequency by 10 cm$^{-1}$. In this case the laser source 75 is a $CO_2$ laser. The laser source 75 may also produce an ultraviolet beam. In this scheme, known as isotopically selective infrared-ultraviolet dissociation, the improved laser selectively excites the desired isotopic species vibrationally, and the selectively excited molecules exhibit enhanced cross section for dissociation by an ultraviolet laser. The ultraviolet laser source for the alkoxides which are the subject of this invention should produce radiation of wavelength about 2200 Angstroms (45454 cm$^{-1}$). Such a laser is an excimer laser. The frequency difference between the radiation from source 73 and from source 75 should be such, that the radiation from source 75 does not coincide with a strong absorption band of either the selected isotopic molecule or the unselected molecule.

After being excited, the vapor and gas passes into separation chamber 77, the powder or polymer of the excited isotope passes through channel 79 for further processing and the remainder of the material passes through channel 81. If the selected isotope is $^{90}Zr$, the material passing through channel 79 is processed to produce reactor parts. If the selected isotope is $^{91}Zr$, the material passing through channel 81 is processed to produce the reactor parts. In this case an additional step may be desirable. In this step the material depleted in $^{91}Zr$ is also depleted in hafnium.

While preferred practice of this invention has been disclosed herein, many modifications thereof are feasible. This invention is not to be restricted except insofar as is necessitated by the spirit of the prior art.

We claim:

1. The method of producing zirconium having a low neutron-absorption cross section for use in parts of a nuclear reactor, the said method comprising producing a material of one or more of the class of compounds consisting of zirconium tetra-tertiary butoxide, $Zr(OC_4H_9)_4{}^t$, zirconium tetra-tertiary amyloxide, $Zr(OC_5H_{11})_4{}^t$, and zirconium tetra-tertiary isopropoxide, $Zr(OC_3H_7)_4{}^t$, said compounds containing a plurality of isotopes of zirconium, subjecting the vapor emitted from said material to radiation emitted from a carbon dioxide laser tuned to the vibration of the fundamental of the C—O—$^{90}Zr$ bond of said material, to excite selectively the C—O—$^{90}Zr$ bond, whereby the $^{90}Zr$ component of said material is decomposed, separating the product of the decomposition of the $^{90}Zr$ component from the remainder of the irradiated material, and forming the said parts of a nuclear reactor of zirconium of said $^{90}Zr$ component of said material.

2. The method of claim 1 wherein the material is subjected to a temperature at which it has a relatively high vapor pressure and the vapor from said material is adiabatically expanded reducing its temperature to reduce the population in the material of higher vibrational quantum levels, and the vapor at the reduced temperature is subjected to radiation emitted by the carbon dioxide laser as recited in claim 1.

3. The method of claim 2 wherein the material is subjected to a temperature of between 423° K. and 473° K. and its vapor is reduced by adiabatic expansion to a temperature of about 50° K.

4. The method of claim 1 wherein, in addition to being irradiated by radiation tuned to the frequency of the vibrations of the fundamental of the C—O—$^{90}Zr$ bond, the vapor is irradiated by infrared radiation from a second $CO_2$ laser tuned to a frequency displaced from said frequency of the vibrations of the C—O—$^{90}Zr$ bond.

5. The method of claim 1 wherein, in addition to being irradiated by radiation tuned to the frequency of the vibrations of the fundamental of the C—O—$^{90}Zr$ bond, the vapor is irradiated by ultraviolet radiation.

6. The method of claim 1 wherein the molecules of the specified zirconium alkoxides decompose into components existing in different phases as a result of being subject to radiation from the carbon dioxide laser, the component containing the selected zirconium isotope existing in one of said phases and the said zirconium-containing component being separated in reliance upon its physical difference from other components existing in the other phases.

7. The method of producing zirconium having a low neutron-absorption cross section for use in parts of a nuclear reactor, the said method comprising producing a material of one or more of the class of compounds consisting of zirconium tetra-tertiary butoxide, $Zr(OC_4H_9)_4{}^t$, zirconium tetra-tertiary amyloxide, $Zr(OC_5H_{11})_4{}^t$, and zirconium tetra-tertiary isopropoxide $Zr(OC_3H_7)_4{}^t$, said compounds containing a plurality of isotopes of zirconium, subjecting the vapor emitted from said material to radiation emitted from a carbon dioxide laser tuned to the vibration of the fundamental of the C—O—$^{91}Zr$ bond of said material, to excite selectively the C—O—$^{91}Zr$ bond, whereby the $^{91}Zr$ component of said material is decomposed, separating the product of the decomposition of the $^{91}Zr$ component from the remainder of the irradiated material, and forming the said parts of a nuclear reactor of zirconium from the remainder of said material.

8. The method of claim 7 wherein the material is subjected to a temperature at which it has a relatively high vapor pressure and the vapor from said material is adiabatically expanded reducing its temperature to reduce the population in the material of higher vibrational quantum levels, and the vapor at the reduced temperature is subjected to radiation emitted by the carbon dioxide laser as recited in claim 7.

9. The method of claim 7 wherein, in addition to being irradiated by radiation tuned to the frequency of the vibrations of the fundamental of the C—O—$^{91}Zr$ bond, the vapor is irradiated by infrared radiation from a second $CO_2$ laser tuned to a frequency displaced from said frequency of the vibrations of the C—O—$^{91}$Zr bond.

10. The method of claim 7 wherein, in addition to being irradiated by radiation tuned to the frequency of the vibrations of the fundamental of the C—O—$^{91}$Zr bond, the vapor is irradiated by ultraviolet radiation.

11. The method of claim 7 wherein the compounds, in addition to containing a plurality of isotopes of zirconium, also contains a plurality of hafnium isotopes as hafnium tetra-tertiary butoxide, $Hf(OC_4H_9)_4{}^t$, hafnium tetra-tertiary amyloxide, $Hf(OC_5H_{11})_4{}^t$, and hafnium tetra-tertiary isopropoxide, $Hf(OC_3H_2)_4{}^t$, the said method including the steps of subjecting the resulting material from which the $^{91}$Zr has been separated to radiation from a $CO_2$ laser tuned to the frequency of the vibration of the C—O—Hf bond, whereby the Hf component of the resulting material is decomposed, separating the product of the decomposition from the remainder of the resulting material and forming the parts of a nuclear reactor of zirconium from the said remainder of said resulting material.

12. The method of claim 7 wherein the molecules of the specified zirconium alkoxides decompose into components existing in different phases as a result of being subject to radiation from the carbon dioxide laser, the component containing the selected zirconium isotope existing in one of said phases and the said zirconium-containing component being separated in reliance upon its physical difference from other components existing in the other phases.

13. The method of producing zirconium having a low neutron-absorption cross section for use in parts of a nuclear reactor, the said method comprising producing a material of one or more of the class of compounds consisting of zirconium tertiary butoxide, $Zr(OC_4H_9)_4{}^t$, and zirconium amyloxide $Zr(OC_5H_{11})_4{}^t$, said compounds containing a plurality of isotopes of zirconium, subjecting the vapor emitted from said material to radiation emitted from a carbon dioxide laser tuned to the vibration of the fundamental of the C—O—$^s$Zr bond of a selected $^s$Zr isotope of said material, whereby the $^s$Zr component of said material is decomposed, separating the product of the decomposition of the $^s$Zr component from the remainder of said irradiated material, and forming the said parts of whichever of the separated $^s$Zr component of said material or of the remainder of said material in which the zirconium has the minimum neutron absorption cross section.

14. The method of claim 13 wherein the molecules of the specified zirconium alkoxides decompose into components existing in different phases as a result of being subject to radiation from the carbon dioxide laser, the component containing the selected zirconium isotope existing in one of said phases and the said zirconium-containing component being separated in reliance upon its physical difference from other components existing in the other phases.

* * * * *